Figure 1:
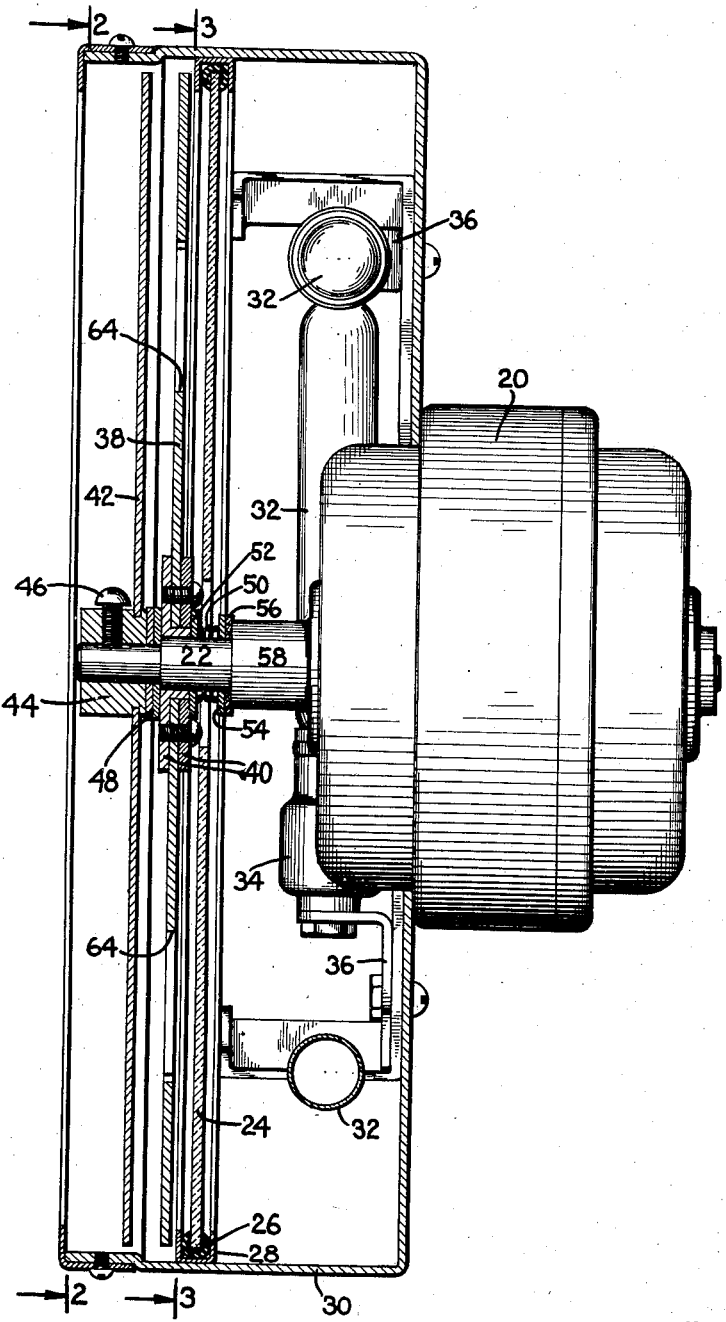

March 29, 1932.　　　J. H. KLIEGL　　　1,851,585
COLOR DISPLAY DEVICE
Filed March 19, 1931　　4 Sheets-Sheet 1

March 29, 1932. J. H. KLIEGL 1,851,585

COLOR DISPLAY DEVICE

Filed March 19, 1931 4 Sheets-Sheet 2

INVENTOR
John H. Kliegl
BY
ATTORNEYS
Cooper, Kerr & Dunham

March 29, 1932.  J. H. KLIEGL  1,851,585
COLOR DISPLAY DEVICE
Filed March 19, 1931  4 Sheets-Sheet 3

INVENTOR
John H. Kliegl
BY ATTORNEYS
Cooper, Kerr & Dunham

March 29, 1932.  J. H. KLIEGL  1,851,585
COLOR DISPLAY DEVICE
Filed March 19, 1931    4 Sheets-Sheet 4

INVENTOR
John H. Kliegl
BY   ATTORNEYS
Cooper, Kerr & Dunham

Patented Mar. 29, 1932

1,851,585

UNITED STATES PATENT OFFICE

JOHN H. KLIEGL, OF NEW YORK, N. Y.

COLOR DISPLAY DEVICE

Application filed March 19, 1931. Serial No. 523,891.

An object of the present invention is to disclose a device, of particular utility in the art of display advertising, in which an attractive changeable color display is partially interrupted at intervals in order to show advertising messages. It is well adapted for use in locations such as show windows, for attracting the attention of passers-by.

The device, in one form comprises; a stationary plate bearing advertising messages; a rotatable color disc in front of the plate and having slots through which, under certain conditions the advertising messages may be read; and a power driven shutter in front of the color disc.

In the particular embodiment illustrated and described herein the advertising messages are on a translucent plate illuminated from the rear; an electric motor is placed behind the plate with its shaft passing through the plate; the color disc is mounted on the motor shaft and is impositively driven therefrom; and the shutter is secured to the motor shaft to rotate therewith.

Further and other objects and advantages will be apparent from the specification and claims, and from the accompanying drawings which illustrate what is now considered the preferred embodiment of the invention.

Figure 2:
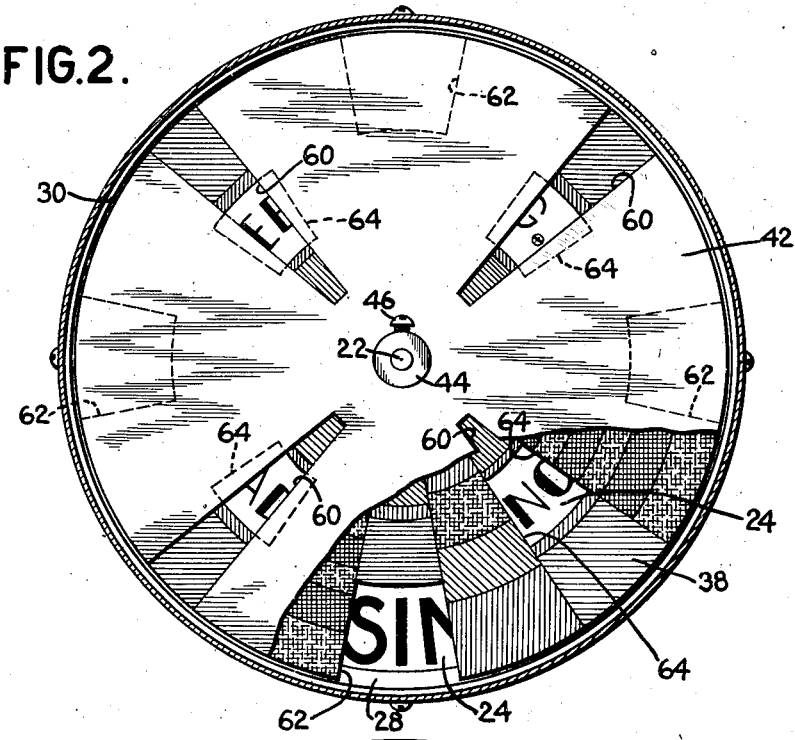
Figure 3:
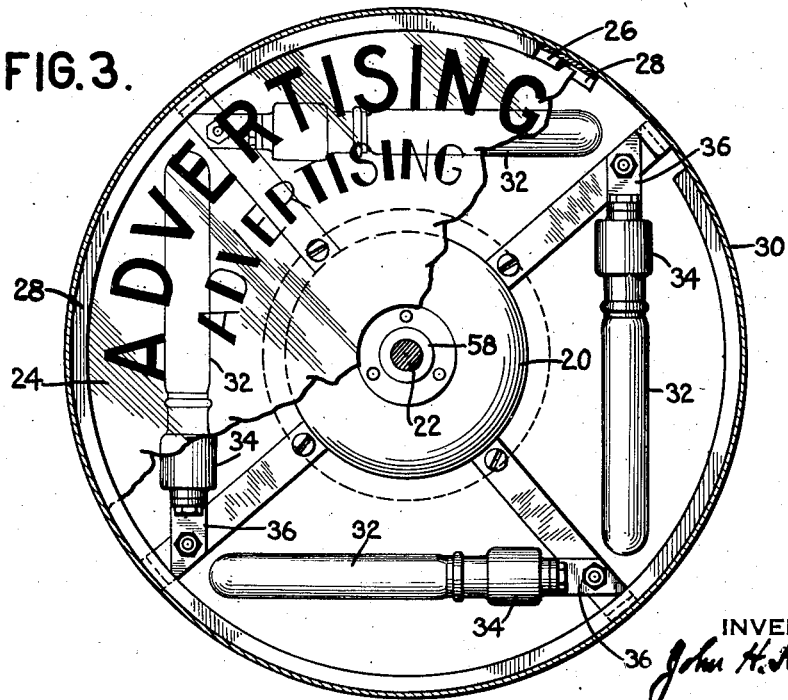
Figure 4:
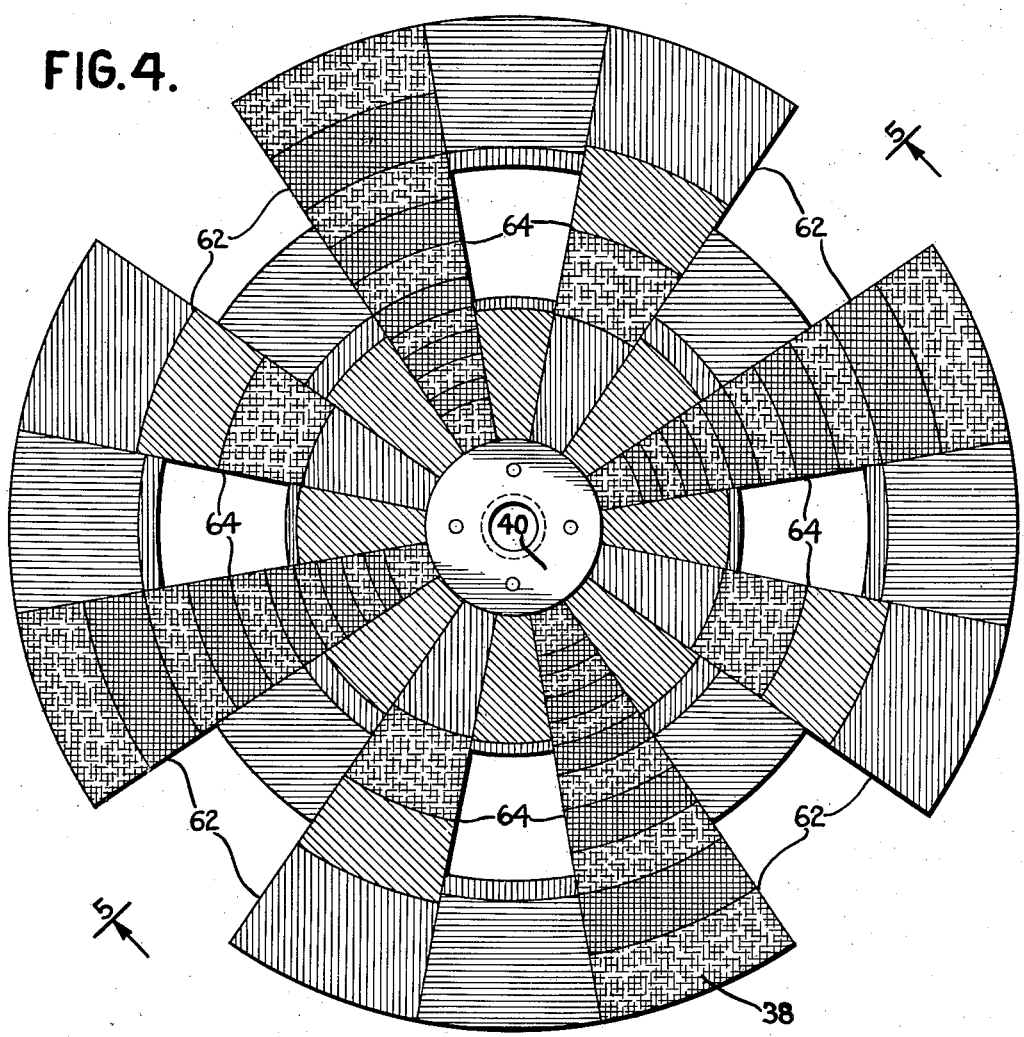
Figure 5:
Figure 8:
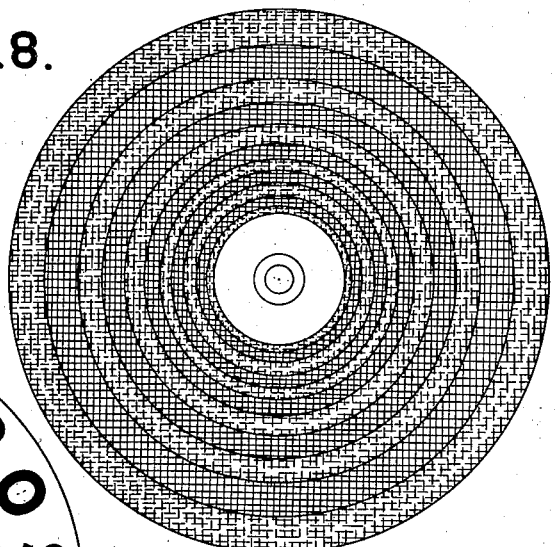
Figure 6:
Figure 9:
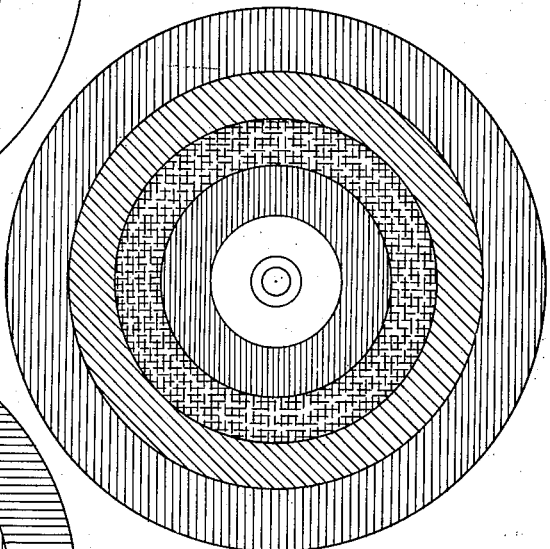
Figure 7:
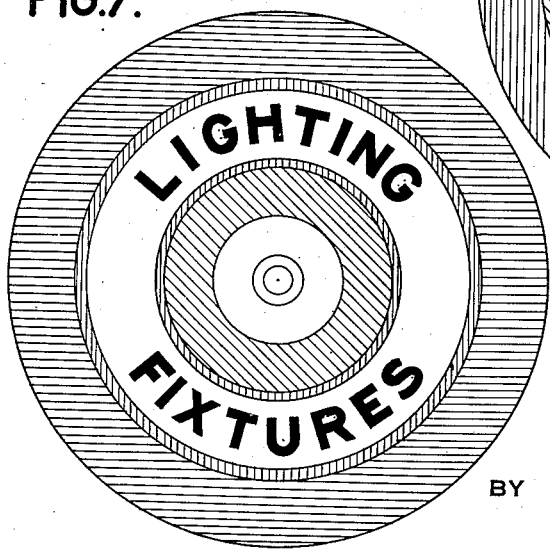

In the drawings:

Fig. 1 shows the device in cross section.
Fig. 2 is a view on line 2—2 of Fig. 1.
Fig. 3 is a view on line 3—3 of Fig. 1.
Fig. 4 is a front view of the color disc.
Fig. 5 is a cross-section on line 5—5 of Fig. 4.
Figs. 6 and 7 are views of the device in operation while displaying different advertising messages and color combinations.
Figs. 8 and 9 are views of different color displays while no advertising messages are visible.

In the drawings the motor is designated 20 and its shaft is 22. A translucent plate 24 is supported, concentric with shaft 22, by rubber packing 26 in annular channels 28 which are fastened to the interior walls of casing 30.

Behind plate 24 are lamps 32 held in sockets 34 mounted on brackets 36 attached to casing 30. In front of plate 24 is the color disc 38 having a hub structure 40 fitted to shaft 22 but free to rotate thereon. In front of disc 38 is the shutter plate 42 attached, by hub 44 and screw 46, to shaft 22.

With the above described structure in mind it will be appreciated that shutter 42 rotates at the same speed as the motor, while disc 38, due to friction between its hub and shaft 22, will also rotate, but at a speed different from that of the shutter. In addition to the frictional resistance between hub 40 and shaft 22, additional resistance is obtained by placing a washer 48 between hub 40 and shutter hub 44, and by pressing hub 40 against washer 48 by means of compression spring 50 through the instrumentality of washer 52. The thrust of spring 50 towards the motor is taken by washer 54, and it has been found advantageous to place a rubber washer 56 between washer 54 and the end of the motor hub 58. The action of the rubber washer is not fully understood, but it serves to cause the color disc 38 to more rapidly pick up speed when the motor is started.

When the motor is running at its predetermined speed, shutter 42 being fast on shaft 22 rotates at the same speed as the motor while color disc 38, being impositively driven by friction, rotates at a somewhat slower speed than the motor.

Shutter 42 (Fig. 2) is simply a circular disc of metal having radial slots 60 cut therein. Translucent stationary plate 24, as shown in Fig. 3, is provided with two advertising messages arranged in two concentric rings, one ring near the outer rim of the plate and the other ring at a lesser radius.

Color disc 38 (Fig. 4) has spaced slots 62 near its rim through which the outer ring of advertising matter may be seen, and spaced slots 64, through which the inner ring of advertising may be viewed. The remaining surface of disc 38 is divided into sectors each variously colored in concentric zones.

In the illustrated embodiment of the invention, each slot 62, 64, and each color sector is 22½ degrees in width while each shutter slot 60 is half that width. The shutter slots are 90 degrees apart, as are also slots 62 and 64, slots 64 being midway between slots 62.

Each sector between slot 62 and the hub of the disc is colored in similar concentric bands of blue, red and green. Each sector outside of each slot 64 is colored in similar concentric bands of blue and red, the sector between slot 64 and the hub being in bands of red and green. The sector on one side of each slot 64 is in bands of red, green, yellow and red, while the sector on the other side of each slot 64 is colored with alternate bands of yellow and black. Each sector is similar to other sectors 90 degrees from it.

In operation, with shutter 42 rotating more rapidly than disc 38, slots 60 travel more or less slowly past the sectors of the disc, similar sectors being visible through each slot 60. While slots 60 of the shutter register with, and are traveling across, slots 62 of the disc, the speed of the shutter is such that the entire outer ring of advertising matter is visible to the eye of the observer, or at least the impression on the eye is the same as if the entire message were visible at the same time. While the advertising message on stationary plate 24 is being read by the observer, the color zones in the same sector with slots 62 are also visible in the form of rings of color concentric with the advertising matter, thus making a very attractive display of advertising matter and color as indicated in Fig. 6.

In like manner, when shutters 60 register with slots 64 the inner advertising message is visible together with the color zones in the same sectors with slots 64 forming a different display of advertising matter and color rings as indicated in Fig. 8.

The above described advertising displays are for only brief spaces of time, sufficient however to permit the observer to read the messages, then as the shutter gains on the slotted color disc the advertising displays will fade out and be replaced by displays of color rings formed by the sectors between slots 62 and 64. These displays are indicated in Figs. 7 and 9.

The various displays fade into each other in comparatively rapid succession dependent on the relative speeds of rotation of shutter 42 and color disc 38.

It is to be understood that the invention is not limited to the specific embodiment herein illustrated and described but may be used in other ways without departure from its spirit as defined by the following claims.

I claim:

1. In a device of the class described, in combination, a motor having a stationary bearing hub and a rotatable shaft projecting therethrough, a shutter having a hub fast on said shaft, a disc having a hub rotatably fitted on said shaft, and means reacting against said motor hub for resiliently pressing said disc hub against said shutter hub whereby said disc will be rotated when said shaft is impositively rotated.

2. The invention set forth in claim 1 in which said resilent pressing means includes a rubber washer in contact with said motor hub.

3. In a display device, a rotatable member, and means for rotating the same, a plate surrounding the rotatable member and carrying an advertising message, a shutter member fixed to the rotatable member and presenting a bearing surface, a slotted member between the plate and the shutter member, said slotted member being loosely mounted upon the rotatable member, and means passing through the plate and engaged with the slotted member for pressing the same into engagement with the bearing surface on the shutter and causing impositive rotation of said slotted member with the rotatable member.

In testimony whereof I hereto affix my signature.

JOHN H. KLIEGL.

CERTIFICATE OF CORRECTION.

Patent No. 1,851,585.  Granted March 29, 1932, to

JOHN H. KLIEGL.

It is hereby certified that error appears in the printed specification of the above numbered patent requiring correction as follows: Page 2, line 65, claim 1, strike out the word "impositively" and insert the same before the word "rotated" in line 64, of same claim; and that the said Letters Patent should be read with this correction therein that the same may conform to the record of the case in the Patent Office.

Signed and sealed this 26th day of April, A. D. 1932.

M. J. Moore,
Acting Commissioner of Patents.

(Seal)